US008661834B2

(12) United States Patent
Tsuji et al.

(10) Patent No.: US 8,661,834 B2
(45) Date of Patent: Mar. 4, 2014

(54) METHOD AND APPARATUS FOR STARTING ENGINE

(75) Inventors: Shigenori Tsuji, Kakogawa (JP); Hiroo Kanaya, Kobe (JP); Yasuo Sarai, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 681 days.

(21) Appl. No.: 12/936,865

(22) PCT Filed: Mar. 16, 2009

(86) PCT No.: PCT/JP2009/001159
§ 371 (c)(1), (2), (4) Date: Nov. 30, 2010

(87) PCT Pub. No.: WO2009/125542
PCT Pub. Date: Oct. 15, 2009

(65) Prior Publication Data

US 2011/0094323 A1 Apr. 28, 2011

(30) Foreign Application Priority Data

Apr. 8, 2008 (JP) ................................ 2008-100800

(51) Int. Cl.

| | |
|---|---|
| ***F02C 7/275*** | (2006.01) |
| ***F02C 7/22*** | (2006.01) |
| ***F02C 7/26*** | (2006.01) |
| ***F02C 9/26*** | (2006.01) |
| ***F02N 7/00*** | (2006.01) |

(52) U.S. Cl.
USPC ............. 60/788; 60/778; 60/790; 123/179.31

(58) Field of Classification Search
USPC ........... 60/625–631, 776, 778, 786–788, 790; 123/179.31–185.13
See application file for complete search history.

(56) References Cited

U.S. PATENT DOCUMENTS

| | | | | |
|---|---|---|---|---|
| 4,494,499 | A * | 1/1985 | Stein | 123/179.31 |
| 4,747,270 | A * | 5/1988 | Klie et al. | 60/627 |
| 4,875,643 | A * | 10/1989 | Gietzen et al. | 244/53 A |
| 5,435,125 | A * | 7/1995 | Telakowski | 60/788 |
| 6,018,199 | A | 1/2000 | Shiroyama et al. | |
| 6,396,165 | B1 | 5/2002 | Nagano et al. | |

FOREIGN PATENT DOCUMENTS

| | | | |
|---|---|---|---|
| JP | 2277962 | A | 11/1990 |
| JP | 11270445 | A | 10/1999 |

(Continued)

OTHER PUBLICATIONS

ISA Japanese Patent Office, International Search Report of PCT/JP2009/001159, Apr. 7, 2009, 2 pages.

*Primary Examiner* — Christopher Jetton
(74) *Attorney, Agent, or Firm* — Alleman Hall McCoy Russell & Tuttle LLP

(57) ABSTRACT

The present invention provides a method and apparatus for starting an engine which can decrease the amount of compressed air consumed by air motors and can lessen an increase in a size of a compressed air tank and an increase in a size of an air compressor, and in a method of starting an engine using a plurality of air motors, the number of air motors being operative is decreased before the engine can start increasing its engine speed for itself, at starting. That is, during increasing of the engine speed of the engine at the starting, the number of air motors being operative is decreased from, for example, two to one.

7 Claims, 4 Drawing Sheets

(56) References Cited

FOREIGN PATENT DOCUMENTS

| | | | |
|---|---|---|---|
| JP | 2000161102 | A | 6/2000 |
| JP | 2002349401 | A | 12/2002 |
| JP | 2007092640 | | 4/2007 |
| JP | 2007246030 | A | 9/2007 |
| KR | 1019990068406 | A | 9/1999 |
| RU | 2120056 | C1 | 10/1998 |
| SU | 1288335 | A1 | 2/1987 |

* cited by examiner

METHOD AND APPARATUS FOR STARTING ENGINE

TECHNICAL FIELD

The claimed invention relates to a method and apparatus for starting an engine using a plurality of air motors.

BACKGROUND ART

There are various methods for starting huge engines, for example, engines for use in a generator drive or main engines for ships. One starting method is to directly drive the output shaft of the engine using an air motor (air starter) utilizing compressed air. The air motor continues to rotate until a fuel fed to the engine is ignited and the engine can increase its engine speed for itself. After that, the air motor is decoupled from the engine and stops. The starting method using the air motor is disclosed in Patent document 1 as recited below.

Typically, one air motor is provided for each engine, but there are huge engines provided with two or more air motors. As the engine increases in size, the air motor increases in size and number. The capacity (size) of the air motor is determined by an engine rotational torque required to start rotation of the engine in a stopped state, an engine rotational torque required to maintain or increase the engine speed at which a fuel fed to the engine is ignited, and a reduction gear ratio between a drive gear (pinion) mounted on the air motor and a driven gear (ring gear) mounted on the drive shaft of the engine. When the engine is started using two or more air motors, these air motors are operated together from the start of the operation until the end of the operation.

Patent document 1: Japanese Laid-Open Patent Application Publication No. Hei. 2-277962

DISCLOSURE OF THE INVENTION

Problems to be Solved by the Invention

The air motor continues to rotate until the engine can increase its engine speed for itself and continues to consume compressed air during the rotation. Therefore, in a case where a long time is required to ignite a fuel in the engine (e.g., winter season), or a case where a huge engine is provided with a huge air motor or two or more air motors, the amount of compressed air consumed by the air motor increases, which arises a need for an air tank having a relatively large volume. In a situation where starting occurs many times within a short time, the consumption amount of compressed air also increases, which arises a need for a corresponding huge air tank and a corresponding huge air compressor.

Accordingly, the claimed invention provides a method and apparatus for starting an engine which can decrease a consumption amount of compressed air and can lessen an increase in a size of a compressed air tank and lessen an increase in a size of an air compressor.

Means for Solving the Problem

A method of starting an engine using a plurality of air motors (air starters), according to a claimed invention, comprises at starting, decreasing the number of air motors being operative (rotated by compressed air supplied thereto), before the engine starts increasing its engine speed for itself (setting the number of air motors to less than the number of air motors at the start of starting).

This starting method is directed to decreasing the consumption amount of compressed air by decreasing the number of air motors being operative (changing the number of air motors from, for example, two to one) when the engine is increasing its engine speed at starting. Although rotational drive torque decreases because of the decrease in the number of air motors being operative, the torque required to rotate the engine at starting decreases with an increase in the engine speed, and therefore, starting can be accomplished.

In accordance with this method, it takes a longer time for the engine to increase its engine speed after the number of air motors being operative is decreased, but the consumption amount of compressed air can be significantly decreased. The air consumption amount is decreased to a substantial extent which is much greater than the rate with which the number of air motors is decreased (for example, the air consumption amount can be decreased to ⅓ or less by decreasing the number of air motors being operative by half). This is because the amount of air consumed by the air motor typically increases with an increase in the number of rotations, but in the above method, the number of air motors being operative is decreased at a time point when the engine speed increases and the number of rotations of the air motors becomes relatively higher, thereby reducing an increasing rate of the engine speed and reducing an increasing rate of the number of rotations. To allow the engine to increase its engine speed for itself with a fuel being ignited and to accomplish starting, it is required that the engine increase its engine speed up to a predetermined value or more and be rotated for a predetermined time or longer, using the air motors and others. For the predetermined time or longer, the engine speed is rendered relatively lower by decreasing the number of air motors being operative, instead of keeping more air motors operative to operate the engine at a high speed. As a result, the consumption amount of compressed air decreases more than the rate with which the number of air motors being operative is decreased.

It is preferable that the above starting method may comprise at starting, decreasing the number of air motors being operative, at a time point when the engine speed has reached a predetermined engine speed before the engine starts increasing its engine speed for itself. If the number of air motors is decreased in a state where the engine speed is still too low, the torque generated by the air motors is insufficient and starting of the engine would possibly fail. On the other hand, if the number of air motors is decreased after the engine speed becomes excessively high, the air consumption amount cannot be effectively decreased. For these reasons, the number of air motors being operative at starting is favorably decreased at the time point when the engine speed reaches a predetermined proper engine speed.

Preferably, the above starting method may comprise detecting the engine speed of the engine and a pressure of compressed air supplied to the air motors; and determining whether or not to decrease the number of air motors being operative and determining an engine speed at which the number of the air motors is decreased, according to the detected pressure of the compressed air.

The torque for rotating the engine decreases with a decrease in the number of air motors being operative. Therefore, in a case where the pressure of the compressed air supplied to the air motors is extremely low or a case where the number of air motors being operative is decreased at too early a timing (engine speed does not substantially increase yet), the torque generated by the air motors is insufficient and starting of the engine would possibly fail. Such a failure can be effectively avoided by determining whether or not to decrease the number of air motors being operative and determining the engine speed at which the number of the air motors is decreased, according to the above method.

The above starting method may comprise determining the engine speed at which the number of the air motors is decreased such that the engine speed is higher as the detected pressure of the compressed air is lower; and determining that the number of air motors is not decreased when the detected pressure of the compressed air is not more than a predetermined value.

If the pressure of the compressed air is low, the output torque generated by the operative air motors decreased in number is small (of course, the pressure decreases and output torque decreases with consumption of compressed air), which sometimes makes it impossible to increase the engine speed up to an extent required for starting. When the pressure of the compressed air is low, it is desirable to decrease the number of air motors being operative at a time point when the engine speed sufficiently increases up to an engine speed at which the engine is substantially rotating for itself. If the pressure of the compressed air is particularly low and not more than a certain value (critical value), the engine speed cannot be maintained because of insufficient torque even after the engine speed has increased substantially. In this case, the number of air motors should not be decreased. The above method addresses such a situation and can reduce a chance of failure of starting of the engine.

A starting apparatus of an engine according to a claimed invention, including the engine; a plurality of air motors (air starters) configured to start the engine; and an air tank (coupled to an air compressor) configured to supply compressed air to the air motors, comprises on-off valves provided in paths through which the compressed air is supplied from the air tank, to respectively correspond to the air motors; and a control means configured to output a closing command to one or more of the on-off valves to decrease the number of air motors to which the compressed air is supplied, before the engine starts increasing its engine speed for itself, at starting. An example of such a starting apparatus is shown in FIG. 1.

This starting apparatus can carry out the above mentioned starting method of the engine. At starting, the control means outputs the closing command, to one or more of the on-off valves to decrease the number of air motors being operative.

Preferably, the control means may be configured to output the closing command to one or more of the on-off valves, at a time point when the engine speed has reached a predetermined engine speed before the engine starts increasing its engine speed for itself, at starting. This is because by decreasing the number of air motors being operative at the time point when the engine speed reaches a predetermined proper engine speed, it is possible to avoid a situation where the torque generated by the air motors is insufficient or a situation where the air consumption amount is not effectively decreased.

Preferably, the starting apparatus may further comprise a detector of an engine speed (engine speed detector) and a compressed air pressure detector (pressure detector) which are coupled to the control means, and the control means may be configured to a) determine a value of an engine speed at which a closing command is output to one or more of the on-off valves, according to an air pressure detected by the detector, and to b) output the closing command to one or more of the on-off valves when the engine speed detected by the detector reaches the determined value (i.e., having a calculating section and a commanding section which are capable of such determination and output).

In accordance with this apparatus, the engine speed at which the number of air motors being operative is reduced can be determined according to the detected pressure of the compressed air, as described above. As a result, a failure of starting of the engine which would be caused by insufficient torque of the air motors can be effectively prevented.

Preferably, a critical value of an air pressure may be set in the control means; and the control means may be configured not to output the closing command to the on-off valves, regardless of the engine speed, when the air pressure detected by the detector is not more than the critical value (i.e., having a calculating section and a commanding section for executing this).

The starting device including such control means can reduce a chance of failure of starting of the engine, in cases where the torque may become insufficient if the number of air motors being operative is decreased even after the engine speed has increased substantially.

In particular, the starting apparatus comprising the plurality of air motors including three or more air motors having an equal output, or air motors having different outputs has an advantage.

Such an apparatus makes it possible to suitably select and reduce the number of air motors being operative or suitably select the output of the air motors being operative. As a result, the consumption amount of the compressed air can be lessened sufficiently and the engine can be started with high reliability, with a precise correspondence relationship with the detected pressure of the compressed air.

In particular, the starting apparatus in which the engine is a gas engine has a great advantage.

The gas engine typically has a slow ignition property. At starting, it is necessary to rotate the engine at a relatively low engine speed for a relatively long time (about ten seconds) by using the air motors, etc. until self-ignition occurs and the engine starts increasing its engine speed for itself. Therefore, by decreasing the number of air motors being operative to make the engine speed relatively lower, in the apparatus of the present invention, the consumption amount of compressed air can be significantly decreased as compared to a case where the engine is rotated at a high engine speed with more air motors kept operative.

Advantage Of The Invention

In accordance with a method and apparatus for starting an engine of the present invention, the consumption amount of compressed air can be decreased significantly. Because of this, an air tank and an air compressor can be made compact and their volumes and costs can be decreased. When using the air tank and the like of the same size, the engine can be started more times within a specified time.

By detecting the engine speed and the pressure of the compressed air supplied to the air motors and decreasing (or not decreasing) the number of air motors being operative at a proper timing according to the detected pressure of the compressed air, a chance of a failure of starting of the engine is reduced.

The starting apparatus comprising the plurality of air motors including three or more air motors having an equal output, or air motors having different outputs can accomplish precise and desirable starting.

In the case of using a gas engine as an engine to be started, the consumption amount of compressed air can be decreased more effectively.

DESCRIPTION OF THE REFERENCE NUMERALS

1 gas engine
2, 3 air starter (air motor)
4, 5 on-off valve
9 compressed air tank
10 engine speed detector
11 controller (control means)
12 pressure detector

BEST MODE FOR CARRYING OUT THE INVENTION

Figure 1:
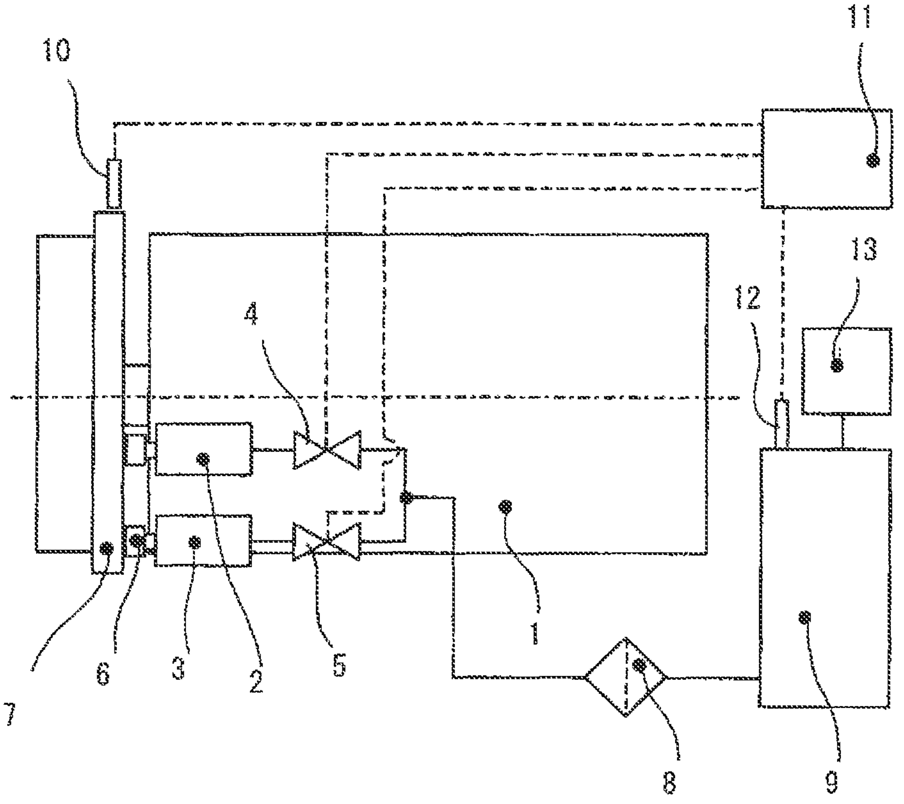
FIG. 1 is a view of an embodiment of the present invention, schematically showing an engine starting apparatus.

An entire starting apparatus of an engine according to an embodiment of the present invention is schematically shown in FIG. 1. In the example of FIG. 1, a huge gas engine 1 is configured to be started by two air starters (air motors) 2 and 3.

No. 1 air starter 2 and No. 2 air starter 3 for starting the gas engine 1 are configured to protrude and rotate pinions 6 provided at their tip ends, by compressed air with a pressure of "A" bar or less supplied thereto. Each of the air starters 2 and 3 has a body mounted to a support member (not shown) and is configured to protrude the pinion 6 to the left in FIG. 1 into mesh with a ring gear 7 mounted on a fly wheel coupled to a crankshaft (not shown) of the engine 1. As a supply means of the compressed air, a compressed air tank 9 provided with an air compressor 13 is coupled to the air starters 2 and 3. As shown in FIG. 1, an air filter 8, No. 1 on-off valve 4 and No. 2 on-off valve 5 are coupled between the compressed air tank 9 and the air starters 2 and 3. The No. 1 on-off valve 4 and the No. 2 on-off valve 5 are configured to individually open and close air paths leading to the air starters 2 and 3, respectively.

The No. 1 on-off valve 4 and the No. 2 on-off valve 5 are opened and closed remotely by a controller (control means) 11. To be specific, the controller 11 outputs command signals (electric signals or controlled air signals) for opening or closing the respective on-off valves 4 and 5, and actuators (not shown) provided at an engine apparatus open and close the on-off valves 4 and 5 individually, in response to the command signals. An engine speed detector 10 is provided in the vicinity of the ring gear 7 and a pressure detector 12 is attached to the compressed air tank 9. Signal output lines of the engine speed detector 10 and the pressure detector 12 are coupled to the controller 11.

The starting apparatus of FIG. 1 uses a starting method in which the two air starters 2 and 3 are driven to rotate the gas engine 1 at an initial stage of the starting operation, and one of the air starters 2 and 3 being operative is stopped at a time point when the engine speed has increased to a certain extent, before the engine starts increasing its engine speed for itself. In particular, the controller 11 coupled with the engine speed detector 10 and the pressure detector 12 operates to determine a proper timing (engine speed of the engine 1) at which one of the air starters 2 and 3 is stopped, according to the pressure of the compressed air. Hereinafter, such a function of the starting apparatus of FIG. 1 will be described in detail.

Figure 2:
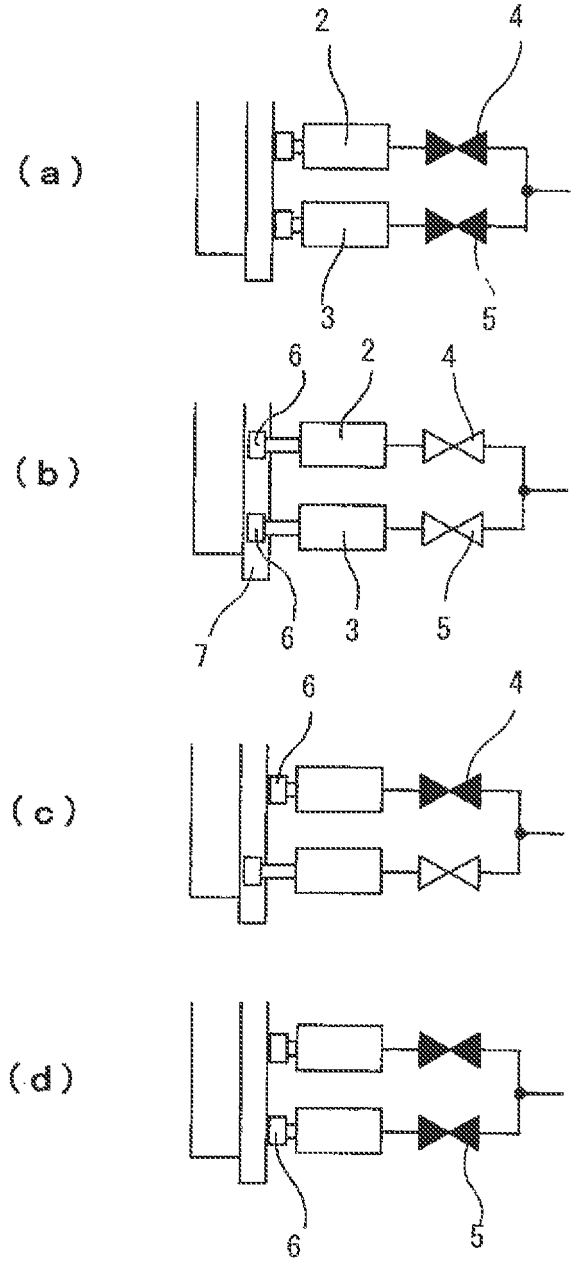
FIGS. 2(*a*) to 2(*d*) are schematic views showing how air starters 2 and 3 in the starting apparatus are operative (on-off valves 4 and 5 are opened and closed).
Figure 3:
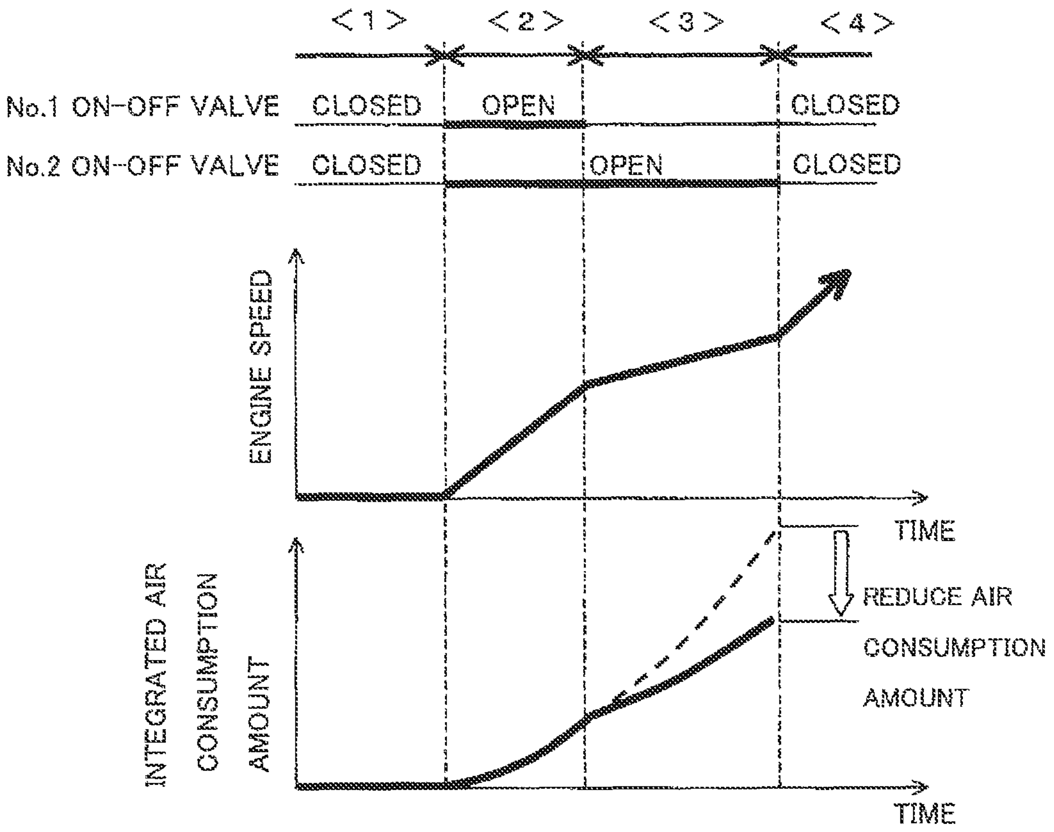
FIG. 3 is a chart showing a change in an engine speed and a change in an integrated air consumption amount which occur with a lapse of time, when the engine is starting.

1) During a stopped state of the engine, the on-off valves 4 and 5 are "closed." To be specific, as shown in FIG. 2(*a*), the controller 11 causes the No. 1 on-off valve 4 and the No. 2 on-off valve 5 to be "closed," and therefore, the compressed air is not supplied to the air starters 2 and 3. This state corresponds to a period represented by <1> in FIG. 3.

2) When the engine 1 is started, the controller 11 causes the two on-off valves 4 and 5 to be "opened" and the compressed air is supplied to the air starters 2 and 3. A maximum rotational torque generated in the air starters 2 and 3 increases the engine speed of the engine 1 in a stopped state. To be specific, as shown in FIG. 2(*b*), the controller 11 causes the No. 1 on-off valve 4 and the No. 2 on-off valve 5 to be "opened" to supply the compressed air to the air starters 2 and 3, thereby allowing the pinions 6 and the ring gear 7 to move into mesh and start rotating together.

3) When the engine speed of the engine 1 increases, a rotational torque required for the air starters 2 and 3 is less than the rotational torque just after the start-up, but the consumption amount of the compressed air increases with an increase in the number of rotations. The state of 2) and 3) corresponds to a period represented by <2> in FIG. 3.

4) When the engine 1 reaches a set engine speed (switching timing), the controller 11 causes one of the on-off valves 4 and 5 to be "closed" to stop one of the air starters 2 or 3, and maintains the other on-off valve in an "open" position to operate the other air starter. After this switching, the amount of air consumed by the air starters 2 and 3 significantly decreases. When it is detected that the engine 1 has reached a set engine speed based on the signal from the engine speed detector 10, the controller 11 causes only, for example, the No. 1 on-off valve 4 to be "closed" as shown in FIG. 2(*c*). Thereupon, the pinion 6 of the No. 1 air starter 2 is moved out of mesh with the ring gear 7, and only the No. 2 air starter 3 drives the engine 1. As a result, it takes a longer time for the engine 1 to increase its engine speed, but the consumption amount of compressed air significantly decreases. This state corresponds to a period represented by <3> in FIG. 3.

When the pressure in the compressed air tank 9 is low, the controller 11 automatically changes the set engine speed to enable the engine 1 to surely increase its engine speed up to a value at which ignition occurs, using only one air starter. When the pressure is lower, the controller 11 causes the on-off valves 4 and 5 not to be "closed" to keep the two air starters 2 and 3 operative so that the engine 1 can start surely (see FIG. 4, described in detail later).

5) When the engine 1 starts increasing its engine speed for itself, the controller causes the remaining on-off valve 5 to be "closed," to terminate the operation of the air starters 2 and 3 for starting the engine 1. When it is detected that the engine 1 has reached a certain set engine speed based on the signal from the engine speed detector 10, in a state where the fuel is injected into and ignited in the engine 1 and thereby the engine 1 is starting to increase its engine speed for itself, the controller 11 causes the on-off valve 5 corresponding to the No. 2 air starter to be "closed" as shown in FIG. 2(*d*) and moves the pinion 6 out of mesh with the ring gear 7. Thus, starting terminates. This operation corresponds to a period represented by <4> in FIG. 3.

Figure 4:
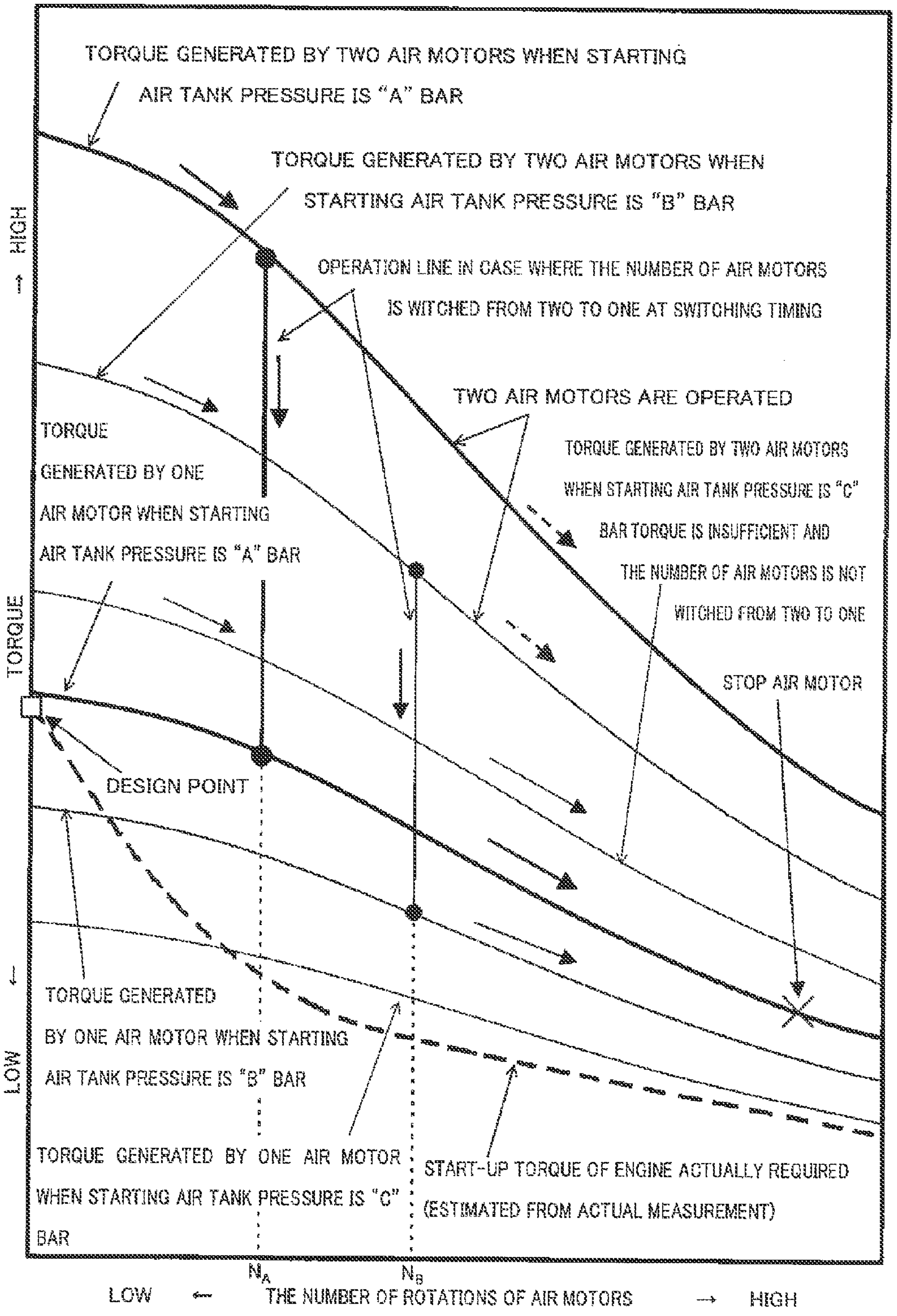
FIG. 4 is a chart showing a relationship between the number of rotations of the air starters 2 and 3 and an output torque, etc., which occur when the engine is starting.

6) When the pressure in the compressed air tank 9 is low, the torque generated in the air starters 2 and 3 decreases. Therefore, to prevent the engine speed from decreasing in a state where only one air starter is operative, after the set switching timing, the controller 11 monitors the pressure in the compressed air tank 9 and automatically changes a switching timing (engine speed) so that the engine 1 can increase its engine speed using only one air starter. FIG. 4 shows such switching of the timing. When the pressure in the compressed air tank 9 is "A" bar, the number of the air starters 2 and 3 being operative is switched from two to one at "$N_A$" rpm, while when the pressure in the compressed air tank 9 is "B" bar, the number of the air starters 2 and 3 being operative is switched from two to one at "$N_B$" rpm.

7) When a low pressure is set in the compressed air tank 9 (condition in which the engine 1 is unable to increase its engine speed up to a value at which ignition occurs, an air pressure is a critical value or less), the controller 11 automatically restricts switching of the air starters 2 and 3 to inhibit the operation of the air starters 2 and 3 from stopping. In the example shown in FIG. 4, when the pressure in the compressed air tank 9 is "C" bar, the number of air starters 2 and 3 being operative is not decreased. This is because the torque generated by one air starter is substantially equal to a torque (indicated by broken line) required to start-up the engine 1 and cannot start-up the engine 1 to an engine speed at which ignition occurs. In this case, since the number of the air starters 2 and 3 being operative is not decreased, the No. 1 on-off valve 4 and the No. 2 on-off valve 5 are both "closed" together.

Industrial Applicability

A method and apparatus for starting an engine of the present invention are useful to engines which require reduction of a consumption amount of compressed air.

The invention claimed is:

1. A method of starting an engine using a plurality of air motors, comprising:

at starting, decreasing a number of air motors being operative at a time point when the engine speed has reached a predetermined engine speed before the engine starts increasing its engine speed for itself;

detecting the engine speed of the engine and a pressure of compressed air supplied to the air motors; and determining whether or not to decrease the number of air motors being operative and determining an engine speed at which the number of the air motors is decreased, according to the detected pressure of the compressed air.

2. The method of starting the engine according to claim 1, comprising:

determining the engine speed at which the number of the air motors is decreased such that the engine speed is higher as the detected pressure of the compressed air is lower; and determining that the number of air motors is not decreased when the detected pressure of the compressed air is not more than a predetermined value.

3. A starting apparatus of an engine, including the engine;

a plurality of air motors configured to start the engine; and an air tank configured to supply compressed air to the air motors, said starting apparatus comprising:

on-off valves provided in paths through which the compressed air is supplied from the air tank, to respectively correspond to the air motors;

a control device configured to output a closing command to one or more of the on-off valves to decrease a number of air motors to which the compressed air is supplied, before the engine starts increasing its engine speed for itself, at starting; and an engine speed detector and a compressed air pressure detector which are coupled to the control device, wherein the control device includes programming to determine a value of an engine speed at which a closing command is output to one or more of the on-off valves, according to an air pressure detected by the detector, and to output the closing command to the one or more of the on-off valves when the engine speed detected by the detector reaches the determined value.

4. The starting apparatus of the engine according to claim 3, wherein the control device is configured to output the closing command to the one or more of the on-off valves, at a time point when the engine speed has reached a predetermined engine speed before the engine starts increasing its engine speed for itself, at starting.

5. The starting apparatus of the engine according to claim 3, wherein a critical value of an air pressure is set in the control device; and the control device is configured not to output the closing command to the on-off valves, regardless of the engine speed, when the air pressure detected by the detector is not more than the critical value.

6. The starting apparatus of the engine according to claim 3, wherein the plurality of air motors include three or more air motors having an equal output, or air motors having different outputs.

7. The starting apparatus of the engine according to claim 3, wherein the engine is a gas engine.

* * * * *